(12) United States Patent
Kyu et al.

(10) Patent No.: US 10,183,486 B2
(45) Date of Patent: Jan. 22, 2019

(54) INKJET PRINTER, TIME SYNCHRONIZATION METHOD THEREFOR, AND SETTING SCREEN USING SAME

(71) Applicant: Hitachi Industrial Equipment Systems Co., Ltd., Chiyoda-ku, Tokyo (JP)

(72) Inventors: An Kyu, Tokyo (JP); Takashi Kawano, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 0 days.

(21) Appl. No.: 15/504,410

(22) PCT Filed: Apr. 8, 2015

(86) PCT No.: PCT/JP2015/061042
§ 371 (c)(1),
(2) Date: Feb. 16, 2017

(87) PCT Pub. No.: WO2016/027501
PCT Pub. Date: Feb. 25, 2016

(65) Prior Publication Data
US 2017/0239945 A1    Aug. 24, 2017

(30) Foreign Application Priority Data

Aug. 19, 2014  (JP) ................. 2014-166650

(51) Int. Cl.
*B41J 2/045*  (2006.01)
*B41J 2/01*  (2006.01)
(Continued)

(52) U.S. Cl.
CPC ............ *B41J 2/04573* (2013.01); *B41J 2/01* (2013.01); *B41J 2/04586* (2013.01); *B41J 5/30* (2013.01);
(Continued)

(58) Field of Classification Search
CPC .................. B41J 2/04573; B41J 2/04586
See application file for complete search history.

(56) References Cited

U.S. PATENT DOCUMENTS 8,560,317 B2    10/2013  Abe

FOREIGN PATENT DOCUMENTS

CN    1539646 A    10/2004
CN    101075434 A    11/2007
(Continued)

OTHER PUBLICATIONS

International Search Report (PCT/ISA/210) issued in PCT Application No. PCT/JP2015/061042 dated May 19, 2015 with English translation (3 pages).
(Continued)

*Primary Examiner* — Bradley Thies
(74) *Attorney, Agent, or Firm* — Crowell & Moring LLP

(57) ABSTRACT

When printing on the same printing object with multiple print nozzles in the past, consideration was not given to cases in which the time relationships of the set times and times-to-be-printed become mismatched between the respective print items of the print nozzles. To solve this problem, an inkjet printer that prints on a conveyed printing object and has multiple print nozzles, multiple auxiliary control units for controlling the printing performed by the multiple print nozzles, and a common main control unit connected to the multiple auxiliary control units via communication unit is provided. The main control unit extracts the time relationship of the set times and the time relationship of the times-to-be-printed between the items to be printed by the respective print nozzles of the multiple print nozzles and revises the print data so as to preserve the time relationship of the set times.

8 Claims, 5 Drawing Sheets

(51) Int. Cl.
   *B41J 5/30*      (2006.01)
   *B41J 29/38*     (2006.01)
   *B41J 29/42*     (2006.01)
   *G06K 15/00*     (2006.01)
   *G06K 15/02*     (2006.01)

(52) U.S. Cl.
   CPC ............ *B41J 29/38* (2013.01); *B41J 29/42* (2013.01); *G06K 15/005* (2013.01); *G06K 15/1822* (2013.01); *G06K 15/1856* (2013.01)

(56) References Cited

FOREIGN PATENT DOCUMENTS

| | | | |
|---|---|---|---|
| JP | 6-161915 A | | 6/1994 |
| JP | 10-6571 A | | 1/1998 |
| JP | 2003-182060 A | | 7/2003 |
| JP | 2003182060 A | * | 7/2003 |
| JP | 2011-140130 A | | 7/2011 |

OTHER PUBLICATIONS

Japanese-language Written Opinion (PCT/ISA/237) issued in PCT Application No. PCT/JP2015/061042 dated May 19, 2015 (4 pages).
Extended European Search Report issued in counterpart European Application No. 15834129.7 dated Mar. 14, 2018 (seven pages).
Chinese-language Office Action issued in counterpart Chinese Application No. 201580044167.0 dated Apr. 4, 2018 (five pages).

* cited by examiner

FIG. 2A

```
SCREEN DISPLAYING                          2014. 03. 30  23:59
WHAT IS PRINTED

ITEM 1 — EXPIRATION : 2014.04.01    LOT003   — ITEM 3
             DATE
    ITEM 2 — PRODUCTION : 2014.03.30  08 : 44  EFH
             DATE

MACHINE TIME              11       (HRS.)
    OPERATING TIME           325       (HRS.)
    NO. OF PRINITNGS DONE  32503       (TIMES)
    INK PRESSURE           0.250       (MPa; STANDARD
                                        VALUE 0.250)
```

FIG. 2B

```
SCREEN FOR SETTING TIME                    2014. 03. 30  23:59
SYNCHRONIZATION

SYNCHRONIZE      DO     NOT DO
    TIME
              NO. OF ITEMS TO    2      (2~8)
              SYNCHRONIZE
              ITEM NO. TO        1       2
              SYNCHRONIZE 1  2  3  4  5  6  7  8  9  0   FIX   CANCEL
```

FIG. 3

```
SCREEN DISPLAYING                    2014. 03. 30  23:59
WHAT IS PRINTED

┌─────────────────────────────────────────────┐
   │                                             │
   │  ┌──────────────────────┐  ┌─────────┐      │
   │  │EXPIRATION            │  │ LOT003  │      │
   │  │DATE     : 2014.04.01 │  └─────────┘      │
   │  └──────────────────────┘            ┌──────┤
   │  ┌──────────────────────────────┐    │2ND ROW│
   │  │PRODUCTION                    │    │ITEM 2 │
   │  │DATE      : 2014.03.30  23:59  EFH │       │
   │  └──────────────────────────────┘    │       │
   └─────────────────────────────────────────────┘
        1              10              20
   ┌───┬──────────────────────────────────┬───┐
   │ ← │ PRODUCTION                       │ → │
   │   │ DATE     : 2014.03.30  23 : 59 EFH│   │
   ├───┴──┬────┬────┬────┬────┬────┬────┬──┴┬──┤
   │ A │ B │ C │ D │ E │ F │ G │ H │ I │ J │     │
   ├───┼───┼───┼───┼───┼───┼───┼───┼───┼───┤─────┤
   │ K │ L │ M │ N │ O │ P │ Q │ R │ S │ T │ FIX │
   ├───┼───┼───┼───┼───┼───┤───┴───┴───┴───┼─────┤
   │ U │ V │ W │ X │ Y │ Z │               │CANCEL│
   └───┴───┴───┴───┴───┴───┴───────────────┴─────┘
```

INKJET PRINTER, TIME SYNCHRONIZATION METHOD THEREFOR, AND SETTING SCREEN USING SAME

TECHNICAL FIELD

The present invention relates to an inkjet printer.

BACKGROUND ART

An inkjet printer (hereinafter referred to as IJP) is widely used for applications such as printing characters to represent a production lot number, a production date, an expiration date, etc. upon a product. Especially, in the food industry or the like, a production time is often printed together with an expiration date and, lately, a requirement has been made to print a time in hours, minutes, and even seconds.

To fulfill the above requirement, an IJP acquires time information from a Real Timer Clock (hereinafter referred to as RTC) and, using the time information, displays a time on screen and automatically updates and creates print data representing current time information and prints a time (hereinafter referred to as calendar printing). However, when calendar printing is performed with a plurality of IJPs, because the RTC of each IJP operates asynchronously, synchronizing times must be performed manually for calendar printing of a same time with the IJPs, each time a difference between times occurs, and this requires a lot of labor.

As a background art in the present technical field, there is Japanese Unexamined Patent Application Publication No. 2003-182060 (Patent Literature 1). Patent Literature 1 describes an inkjet printing system which includes a plurality of IJPs that print time information on one printing object and which is arranged such that updating time information to be printed by the plurality of IJPs is managed by a common main controlling device to avoid inconsistency of times to be printed by each IJP.

CITATION LIST

Patent Literature

Patent Literature 1: Japanese Unexamined Patent Application Publication No. 2003-182060

SUMMARY OF INVENTION

Technical Problem

However, in Patent Literature 1, no consideration was taken for a case where a time relationship between print items becomes inconsistent between a time that is set and a time that is printed. For instance, it is assumed that, when an IJP (A) prints an expiration date and an IJP (B) prints a production time on the same printing object, one day after the current date is set to be printed as the expiration date and the current time (in hours, minutes, and even in seconds) is set to be printed as the production time. This case is explained below. For instance, when a printing object detection signal detecting the arrival of a printing object becomes ON at 23 o'clock, 59 minutes, and 59 seconds on Mar. 30, 2014, the IJP (A) acquires and creates current date time data (Mar. 30, 2014) and prints an expiration date of 14.3.31 which is one day after the current date on the printing object, whereas the IJP (B) may print a production time of 00:00:00 of day 31 on the printing object. This is because time after the printing object detection signal until printing starts by printing setting (this time is referred to as printing start preparation time, hereinafter) differs with respect to each IJP. In this case, although the respective IJPs printed times as set, printing results show that the same day is printed as the expiration date and the production date on the same printing object and inconsistency between what has been set and what is printed occurs.

Therefore, the present invention provides an inkjet printer that performs a printing operation to avoid inconsistency between what has been set and what is printed between print items (such operation is referred to as synchronizing times, hereinafter) when printing on the same printing object with a plurality of nozzles. Further, the present invention provides an inkjet printer in which this inkjet printer can set items to synchronize times to print easily.

Solution to Problem

To solve the problem noted above, for example, a configuration as described in claims is adopted. By way of example, an inkjet printer that prints on a printing object being conveyed is configured as follows: the inkjet printer includes a plurality of printing nozzles, a plurality of auxiliary control units that control printing with the plurality of printing nozzles, and a common main control unit connected to the plurality of auxiliary control units through communication means; and the main control unit is provided with a deriving function to derive a relationship between times that have been set and a relationship between times that are printed between print items with each of the plurality of printing nozzles and a correcting function to correct print data to maintain the relationship between times that have been set.

Advantageous Effects of Invention

According to the present invention, it is enabled to perform printing, while maintaining a time synchronization relationship between items to synchronize, which have been set.

BRIEF DESCRIPTION OF DRAWINGS

FIGS. 2A and 2B are setting screens of a touch input & display panel of the inkjet printer according to the present embodiment.

FIG. 3 is a setting screen for editing what is printed for each item number on the touch input & display panel of the inkjet printer according to the present embodiment.

DESCRIPTION OF EMBODIMENTS

In the following, an embodiment of the present invention will be described with the drawings.

Figure 1:
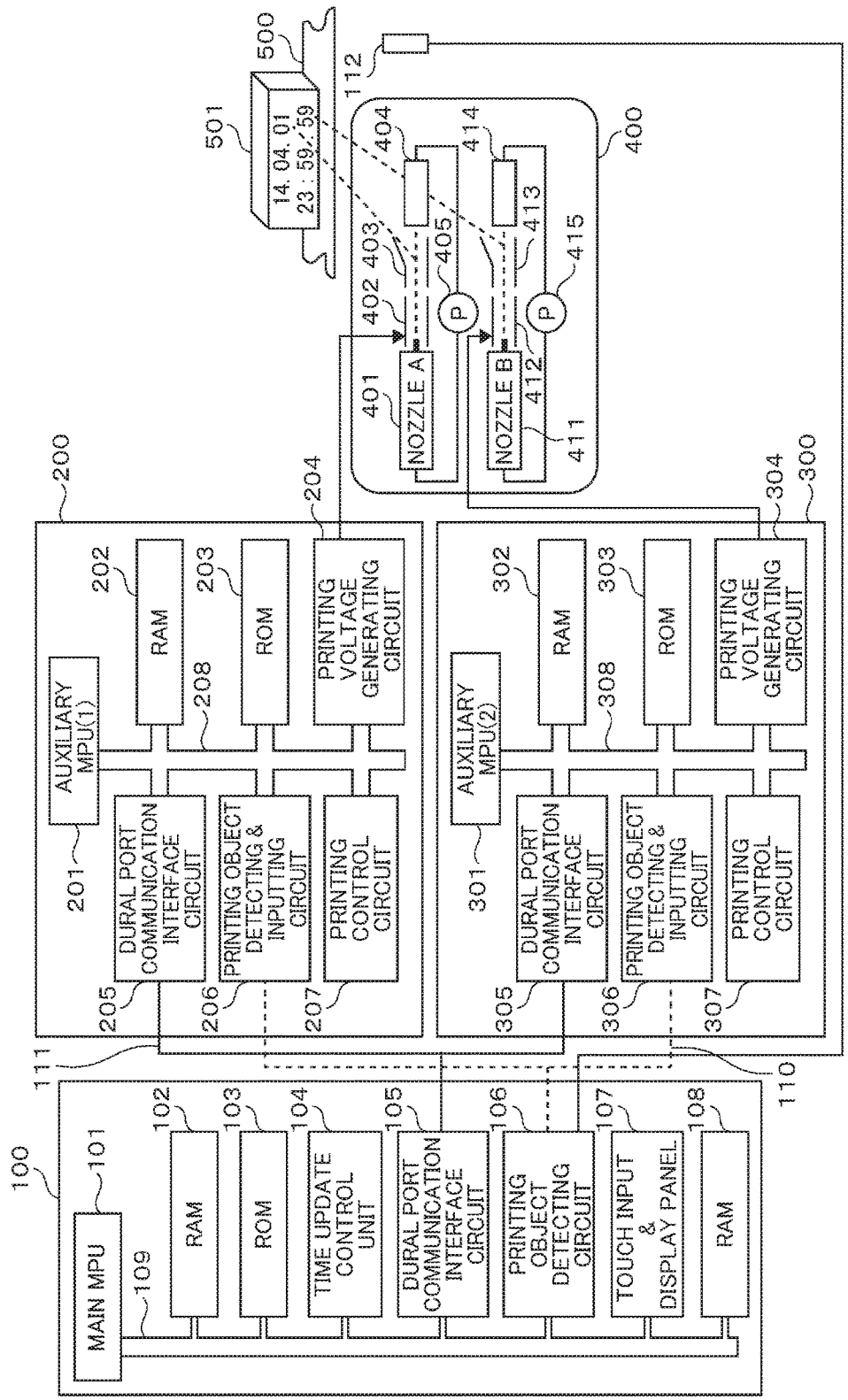
FIG. 1 is a block diagram depicting a configuration of an inkjet printer according to an embodiment of the present invention.

FIG. 1 is a block diagram depicting a configuration of an inkjet printer according to the present embodiment. Reference numeral 100 denotes a main control unit that exerts overall control of the inkjet printer; 200 and 300 denote auxiliary control units that control respective nozzles; and 400 denotes a print head portion.

The main control unit 100 includes a main MPU (micro processing unit) 101 that exerts overall control of the inkjet printer, a RAM (random access memory) 102 that temporarily stores data in the inkjet printer, a ROM (read only memory) 103 that stores software and data, a time update control unit 104, a dual port communication interface circuit 105, a printing object detecting circuit 106, a touch input & display panel 107, an RTC 108 having time information, and a bus 109 for communication of data or the like.

An auxiliary control unit 200 includes an auxiliary MPU (micro processing unit) 201 that controls printing with a nozzle, a RAM (random access memory) 202 that temporarily stores data, a ROM (read only memory) 203 that stores data, a printing voltage generating circuit 204, a dual port communication interface circuit 205, a printing object detecting and inputting circuit 206, a printing control circuit 207, and a bus 208 for communication of data or the like.

An auxiliary control unit 300, like the auxiliary control unit 200, includes an auxiliary MPU (micro processing unit) 201 that controls printing with a nozzle, a RAM (random access memory) 302 that temporarily stores data, a ROM (read only memory) 203 that stores data, a printing voltage generating circuit 304, a dual port communication interface circuit 305, a printing object detecting and inputting circuit 206, a printing control circuit 307, and a bus 308 for communication of data or the like.

The print head portion 400 includes a nozzle A 401 and a nozzle B 411 that jet ink, charging electrodes 402 and 412 that charge printing particles, deflecting electrodes 403 and 413 that deflect ink particles, gutters 404 and 414 for collecting ink particles not used for printing, and pumps 405 and 415 that collect ink.

In addition, the dual port communication interface circuit 105 of the main control unit 100, the dual port communication interface circuit 205 of the auxiliary control unit 200, and the dual port communication interface circuit 305 of the control circuit 300 are connected through a signal line 111. The printing object detecting circuit 106 of the main control unit 100, the printing object detecting and inputting circuit 206 of the auxiliary control unit 200, and the printing object detecting and inputting circuit 306 of the auxiliary control unit 300 are connected through a signal line 110. That is, the main control unit 100 and the auxiliary control units 200, 300 are connected by the dual port communication interface circuits which are communication means and the signal lines.

By operating the touch input & display panel 107 and inputting initial settings and printing information, this inkjet printer, particularly, the main MPU 101 of the main control unit 100 and the auxiliary MPUs 201, 301 of the auxiliary control units 200, 300 executes a printing control process, as will be described below, according to a printing control program stored in the ROMs 103, 203, 303.

The main MPU 101 of the main control unit 100 prompts an operator to input initial settings and printing information via the touch input & display panel 107 and the thus input initial settings and printing information are transferred through the bus line 109 and stored into the RAM 102.

FIG. 2 depict function setting screens which are displayed on the touch input & display panel 107.

FIG. 2(A) is a screen displaying what is printed, in which machine information is displayed, including the current time, what is printed, machine time, operating time, the number of printings done, ink pressure, etc. In the box "what is printed", item 1 represents an expiration period, item 2 represents a production date (year/month/day and in hours/minutes, a production line number), item 3 represents a lot number.

Further, FIG. 2(B) is a screen for setting time synchronization, in which "synchronize times" sets whether the auxiliary control units 200, 300 need to exert control to synchronize times to print ("Do" requests the auxiliary control units to exert control to synchronize times). The "number of items to synchronize" sets the number of items for which the auxiliary control units 200, 300 need to synchronize times. FIG. 2(B) illustrates an example in which the auxiliary control units are requested to exert control to synchronize times of two items: item 1, expiration date and item 2, production date. At the bottom of the screen, the touch panel's keyboard for input is shown.

Further, FIG. 3 depicts a setting screen example for editing what is printed for each item number on the touch input & display panel. In FIG. 3, an upper half part of the screen is a screen displaying items in the current status and three items are displayed in the current status. When editing what is printed, by choosing any item, the item number is displayed, and the background color of the chosen item turns gray. By pressing "Fix" during editing, a value entered is fixed and reflected in a print. There is an area for editing what is printed in the center of the screen and arrows at both sides of the area are used to scroll within the area for editing what is printed. The area for editing what is printed is also provided with a scale (1 10 20) indicating the number of characters that are present in the area for editing what is printed. In a lower part of the screen, a keyboard for input is shown.

The main MPU 101 of the main control unit 100 transmits initial settings and printing information which have been input to the auxiliary MPUs 201, 301 of the auxiliary control units 200, 300 through the dual port communication interface circuit 105, signal line 111, and dual port communication interface circuits 205, 305.

The auxiliary MPUs 201, 301 of the auxiliary control units 200, 300 transfer the received initial settings and printing information through the bus lines 208, 308 and store them into the RAMs 202, 302. After that, the auxiliary MPUs 201, 301 creates or updates print data, based on the printing information, and further converts the print data to charging data like staircase waves and stores that data into the RAMs 202, 302. Upon detecting arrival of a printing object 501 with a printing object detecting sensor, the printing object detecting circuit 106 generates a printing object detection signal and this printing object detection signal is transferred to the main MPU 101 though the bus line 109. Also, the printing object detecting circuit 106 transmits a printing start command signal to the auxiliary MPUs 201, 301 through the signal line 111 and via the printing control circuits 207, 307.

When the auxiliary MPUs 201, 301 receive the printing start command signal, the auxiliary MPUs retrieve the charging data like staircase waves from the RAMs 202, 302 and transmit that data to the printing voltage generating circuits 204, 304 through the bus lines 208, 308. The printing voltage generating circuits 204, 304 convert the charging data like staircase waves transmitted to them to a charging voltage and send the charging voltage to the charging electrodes 402 and 412 which, in turn, charge ink particles to carry out printing.

When the printing voltage generating circuits 204, 304 completes converting all the charging data like staircase waves transmitted to them, printing is then complete. The printing voltage generating circuits 204, 304 notifies the auxiliary MPUs 201, 301 that printing is complete through the bus lines 208, 308.

When the auxiliary MPUs 201, 301 receive this printing complete notification, the auxiliary MPUs notify the main MPU 101 that printing is complete through the bus lines 208, 308, dual port communication interface circuits 205, 305, signal line 111, dual port communication interface circuit 105, and bus line 109.

Figure 4:
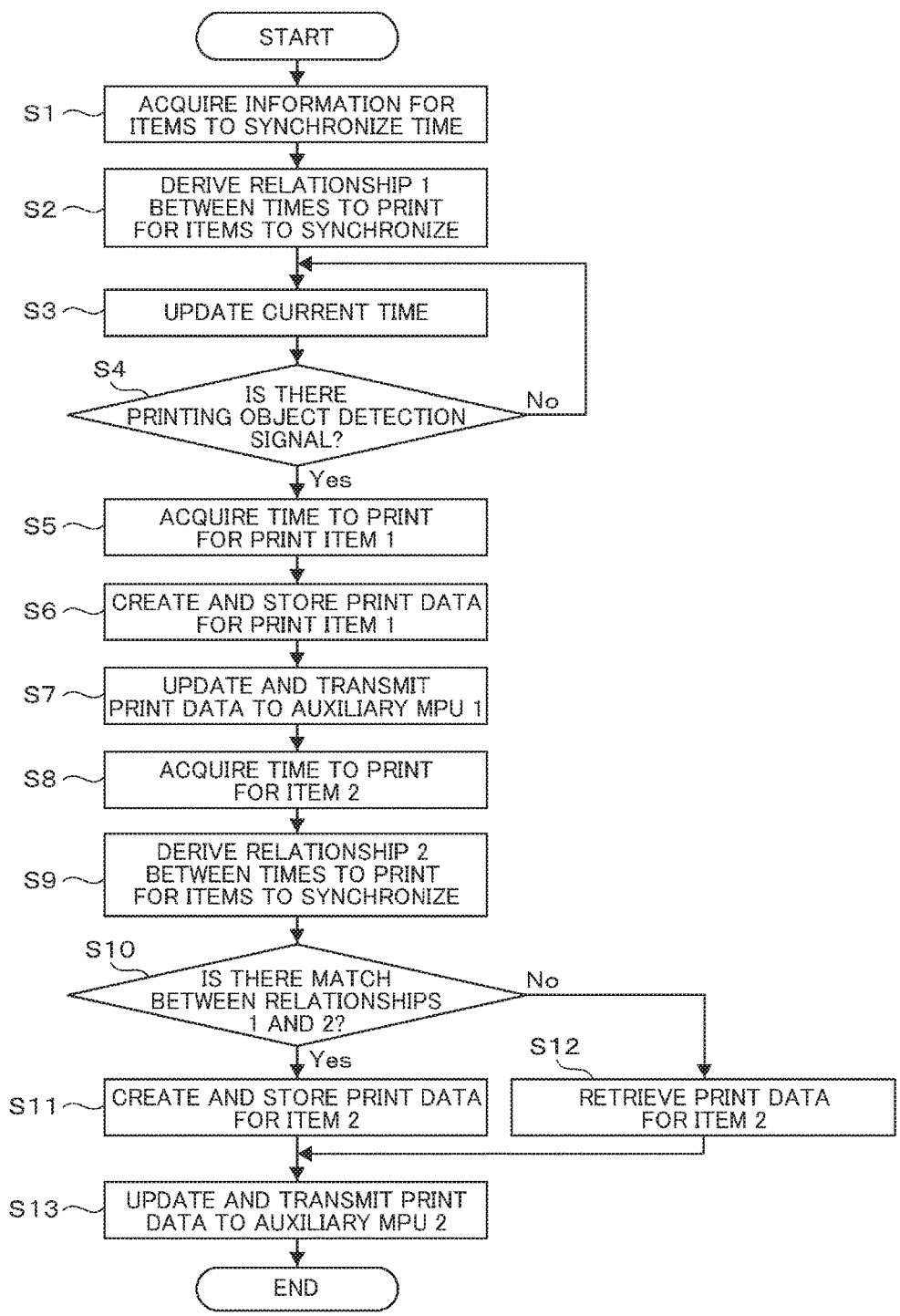
FIG. 4 is a flowchart of a process for synchronizing times, which is executed by a main control unit of the inkjet printer according to the present embodiment.
Figure 5:
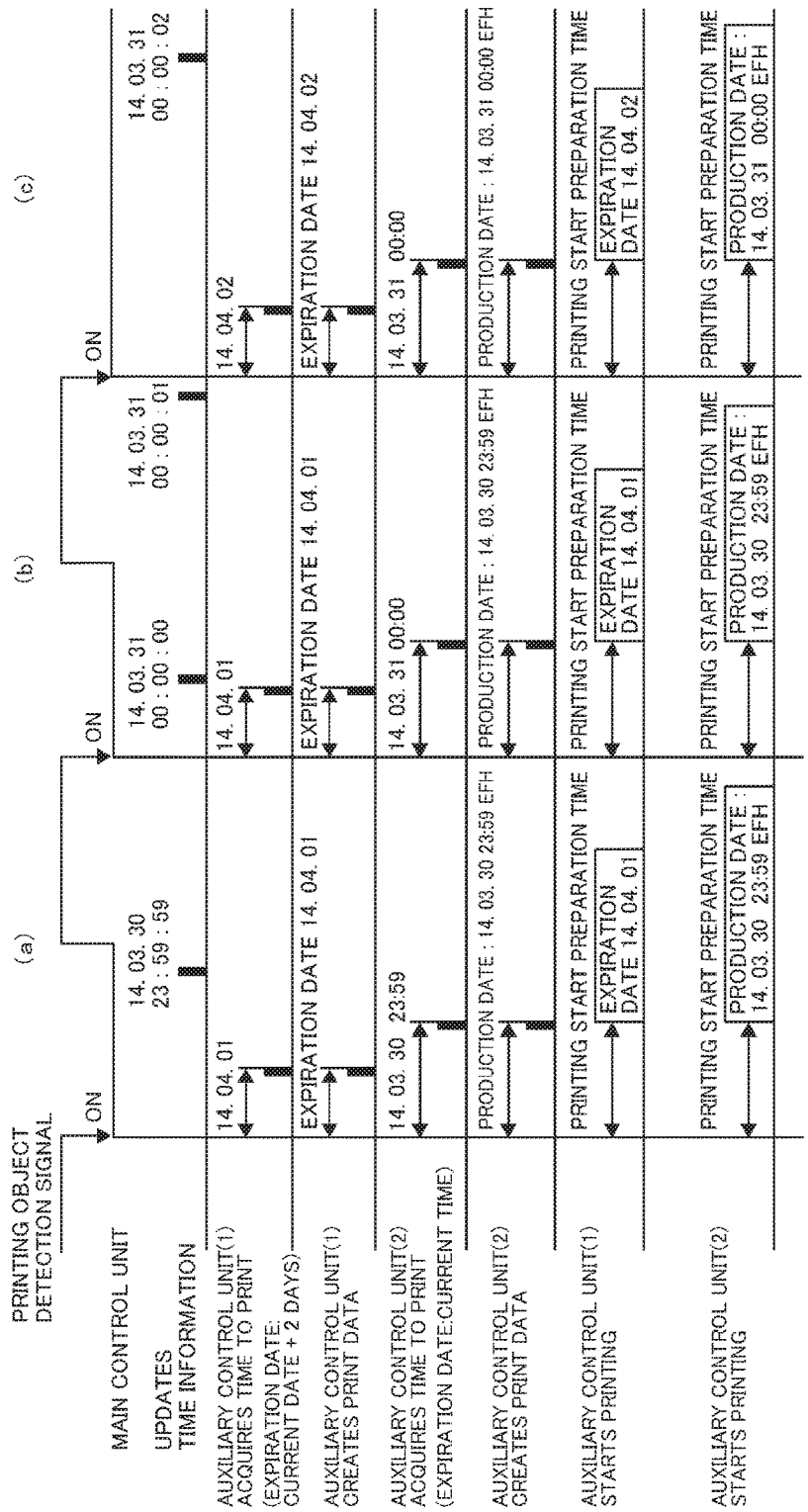
FIG. 5 is a time flow diagram illustrating a time printing operation of the inkjet printer according to the present embodiment.

Then, a description is provided about a series of operations to synchronize print data based on a relationship between times to synchronize, when time information is included in print data. FIG. 4 is a flowchart of a process for synchronizing times, which is executed by the main MPU 101. Further, FIG. 5 is a time flow diagram illustrating a time printing operation. FIG. 5 illustrates an example in which an auxiliary control unit (1) (the auxiliary control unit 200) prints item 1, expiration date and an auxiliary control unit (2) (the auxiliary control unit 300) prints item 2, production date on the same printing object.

First, at step S1 in FIG. 4, through the bus line 109, the main MPU 101 acquires from the RAM 102 what has been set for items to synchronize, i.e., a setting to synchronize times is "Do", the number of items to synchronize is "2", and the item numbers to synchronize are "1" and "2". Through the bus line 109, the main MPU 101 also acquires time data from the RAM 102 and divides that data into the following levels: year/month/day and in hours/minutes/seconds.

In the present embodiment, time data for item 1, expiration date has been set as year/month/day; therefore, such time data, year/month/day is stored into the RAM 102. That is, in FIG. 5, the auxiliary control unit (1) acquires a time to print at timing (a) and a value of date (2014.04.01) in the corresponding field, which is an expiration date that is obtained by adding two days to the current date (2014.03.30), is stored as follows:
RAM_Year_1=2014
RAM_Month_1=04
RAM_Day_1=01

Likewise, time data for item 2, production date has been set as year/month/day and in hours/minutes; therefore, such time data even in minutes is stored into the RAM 102. That is, in FIG. 5, the auxiliary control unit (2) acquires a time to print at timing (a) and a value of the current time (2014.03.30 23:59) in the corresponding field, which is the time of production, is stored as follows:
RAM_Year_2=2014
RAM_Month_2=03
RAM_Day_2=30
RAM_Hour_2=23
RAM_Minute_2=59

Next, at step S2, a relationship between the times for the items to synchronize times is derived by a calculation method as below and stored as RAM_Difference1. Here, the relationship between the times literally indicates a relationship between both. In the present embodiment, as the items to synchronize times, item 1 is expiration date and item 2 is production date, and the expiration date is set to a day that is obtained by adding two days to the production date; therefore, two days are obtained as the relationship between the times that have been set for the two items to synchronize. In other words, it can also be said that a difference value between the items to synchronize times is obtained. And now, because item 1, expiration date is set as year/month/day and item 2, production date is set even in minutes, the relationship between the times for the two items to synchronize is derived in terms of year/month/day.

> RAM_Year_difference=RAM_Year_1−RAM_Year_2=2014−2014=0
>
> RAM_Month_difference=RAM_Month_1−RAM_Month_2=04−03=1
>
> RAM_Day_difference=RAM_Day_1−RAM_Day_2=01−30=−29
>
> RAM_Day_1 (new)=RAM_Month_difference×31 days+RAM_Day_1=31+1=32
>
> RAM_Day_difference (new)=RAM_Day_1 (new)−RAM_Day_2=32−30=2
>
> RAM_Difference1=RAM_Day_difference (new)=2

As described above, the process is arranged such that a relationship between times that have been set for items to synchronize is derived and stored when initial setting is performed; however, a relationship between times that have been set may be derived and stored retroactively when setting item numbers to synchronize in FIG. 2.

Next, at step S3, the RTC 108 acquires time in units of seconds and transfers the time information to the main MPU 101 through the bus line 109. The main MPU 101 stores the time information into the RAM 102 and updates the current time.

At step S4, the main MPU 101 judges whether there is a printing object detection signal. If there is no printing object detection signal, the main MPU 101 returns to step S3 and updates the current time. If there is a printing object detection signal, the main MPU 101 controls timing to start printing by printing setting at step S5. That is, through the bus line 109, the main MPU acquires a time to print for print item 1 at timing (b) in FIG. 5 from the RTC 108 and a value of date (2014.04.01) in the corresponding field when the auxiliary control unit (1) acquires a time to print, which is an expiration date that is obtained by adding two days to the current date, is stored as RAM_Year_1=2014, RAM_Month_1=04, RAM_Day_1=01.

At step S6, the main MPU 101 creates print data from information corresponding to the print item 1 received from the RTC 108 and stores the print data into the RAM 102 through the bus line 109. At step 7, the main MPU 101 transmits the print data to the auxiliary MPU 200 through the bus line 109, dual port communication interface circuit 105, signal 101, and dual port communication interface circuit 205.

At step S8, through the bus line 109, the main MPU 101 acquires a time to print for print item 2 from the RTC 108 and a value of the current time (2014.03.31 00:00) as the time of production in the corresponding field, when the auxiliary control unit (2) acquires a time to print at timing (b) in FIG. 5, is stored into the RAM 102 as RAM_Year_2=2014, RAM_Month_2=03, RAM_Day_2=31, RAM_Hour_2=00, RAM_Minute_2=00.

Next, at step S9, the main MPU 101 automatically drives a relationship between the times for the two items to synchronize in terms of year/month/day by a calculation method as below and stores it into the RAM 102 as RAM_Difference2.

> RAM_Year_difference=RAM_Year_1−RAM_Year_2=2014−2014=0
>
> RAM_Month_difference=RAM_Month_1−RAM_Month_2=04−03=1

RAM_Day_difference=RAM_Day_1−
RAM_Day_2=01−31=−29

RAM_Day_1 (new)=RAM_Month_difference×31
days+RAM_Day_1=31+1=32

RAM_Day_difference (new)=RAM_Day_1 (new)−
RAM_Day_2=32−31=1

RAM_Difference2=RAM_Day_difference (new)=1

At step S10, the main MPU 101 compares relationship 1 between the times (RAM_Difference1) with relationship 2 between the times (RAM_Difference2). If the relationships match, main MPU 101 creates print data for item 2 and stores that data into the RAM 102 at step S11. If the relationships do not match, the main MPU 101 retrieves previously stored print data for item 2 from the RAM 102 through the bus line 109 at step S12.

In the case of the present embodiment, relationship 1 between the times (RAM_Difference1) is 2 and relationship 2 between the times (RAM_Difference2) is 1. That is, the expiration date is set to a day that is obtained by adding two days to the production date, whereas relationship 2 is "+1 day". Therefore, the decision at step S10 is mismatch. Then, at step S12, the main MPU 101 retrieves previously stored print data (2014.03.30 23:59) for item 2 from the RAM 102 through the bus line 109 (a value in the corresponding field, when the auxiliary control unit (2) creates print data at timing (b) in FIG. 5).

Then, at step S13, the main MPU 101 transmits the print data to the auxiliary MPU 300 through the bus line 109, dual port communication interface circuit 105, signal line 111, and dual port communication interface circuit 305.

By executing the above-described process, it is possible to maintain the relationship that is +2 days between the expiration date and the production data at any timing when the auxiliary control unit (1) starts printing and the auxiliary control unit (2) starts printing, as illustrated in FIG. 5. It is thus possible to perform a printing operation to avoid inconsistency between what has been set and what is printed, when printing on the same printing object with a plurality of nozzles.

Therefore, according to the present embodiment, it is enabled to perform printing, while maintaining a time synchronization relationship between items to synchronize, which have been set.

While the embodiment has been described hereinbefore, the present invention is not limited to the foregoing embodiment and various modifications are included therein. For example, although the embodiment where printing is performed with two printing nozzles was described, printing may be performed with three or more nozzles. Further, the present invention is not necessarily limited to an embodiment including all components described. For a subset of the components of the embodiment, other components can be added to the subset or the subset can be removed or replaced by other components.

REFERENCE SIGNS LIST

100: Main control unit
102: RAM
106: Printing object detecting circuit
107: Touch input & display panel
108: RTC (Real Timer Clock)
200, 300: Auxiliary control unit
400; Printing head

The invention claimed is:

1. An inkjet printer that prints on a printing object being conveyed, comprising:
   a plurality of printing nozzles;
   a plurality of auxiliary control units that control printing with the plurality of printing nozzles; and
   a common main control unit connected to the plurality of auxiliary control units through communication means,
   wherein the main control unit is provided with a deriving function to derive a relationship between times that have been set and a relationship between times that are printed between print items with each of the plurality of printing nozzles and a correcting function to correct print data to maintain the relationship between times that have been set.

2. The inkjet printer according to claim 1, wherein the main control unit is provided with means for setting whether or not to do synchronizing times and, if synchronizing times has been set to "do", the main control unit sets the number of items to synchronize and item numbers to synchronize and corrects print data to maintain the relationship between times that have been set.

3. The inkjet printer according to claim 2, wherein the main control unit drives and stores a relationship between times that are set between items to synchronize at initial setting or when setting the item numbers to synchronize.

4. The inkjet printer according to claim 3, wherein the main control unit includes a printing object detecting circuit and, when there is a printing object detection signal indicating arrival of a printing object, detected by the printing object detecting circuit, the main control unit drives and stores a relationship between times that are printed between items to synchronize.

5. The inkjet printer according to claim 4, wherein the main control unit compares a relationship between times that have been set with a relationship between times that are printed before creating print data and, if the relationships do not match, corrects print data using the correcting function.

6. An inkjet printer that prints on a printing object being conveyed with a plurality of printing nozzles, comprising:
   a display that displays a screen for selecting whether or not to do synchronizing times between print items with each of the plurality of printing nozzles; and
   a main control unit provided with a deriving function to derive a relationship between times for a plurality of items requiring the synchronizing times when the synchronizing times has been set to "do".

7. A method for synchronizing times for an inkjet printer that prints on a printing object being conveyed with a plurality of printing nozzles, comprising: deriving a relationship between times that have been set and a relationship between times that are printed between print items with each of the plurality of printing nozzles; comparing the respective relationships between times; and, if the relationships do not match, correcting print data of the print items.

8. The method for synchronizing times for an inkjet printer according to claim 7, wherein correcting print data includes replacing the print data with stored print data.

* * * * *